UNITED STATES PATENT OFFICE.

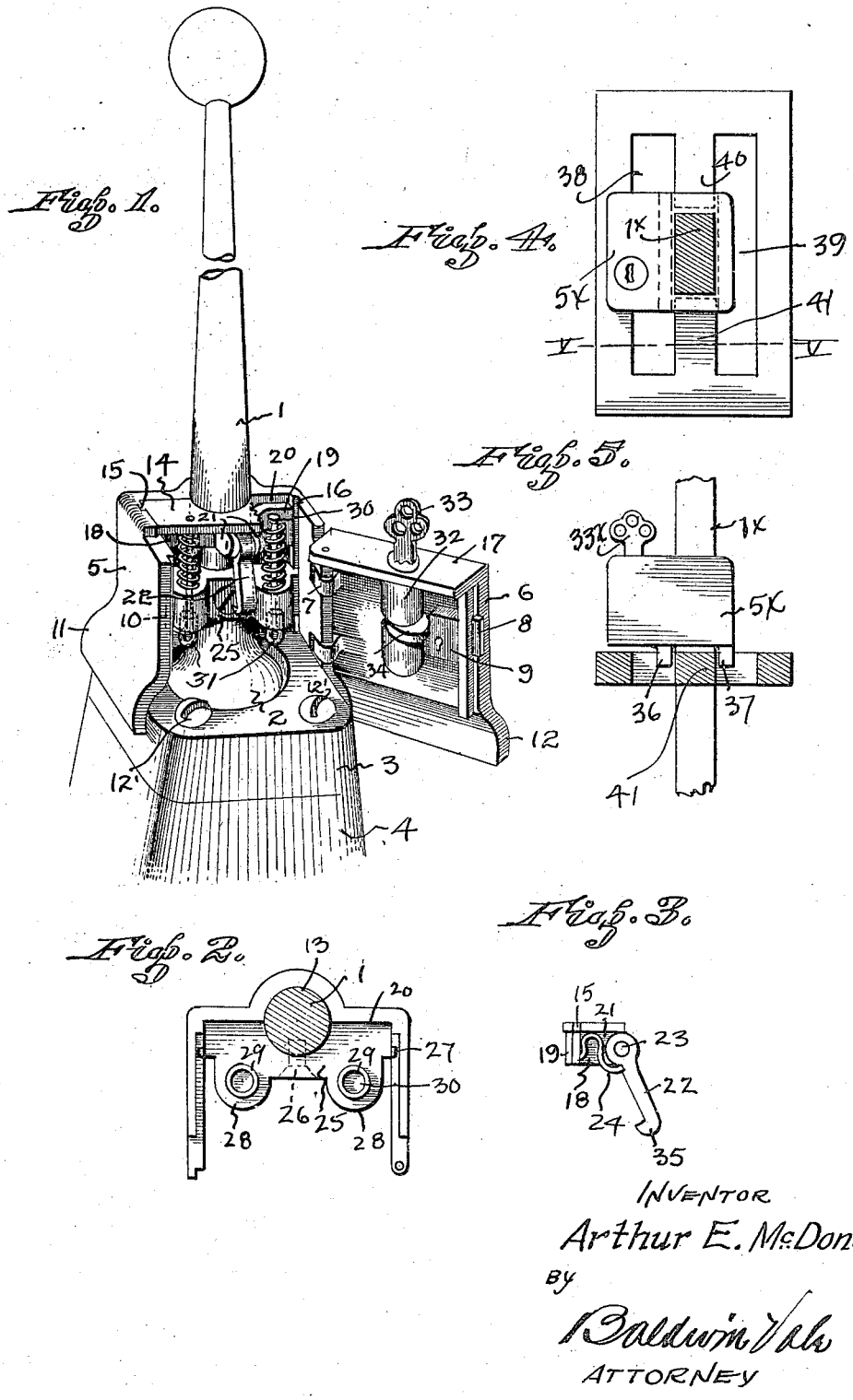

ARTHUR E. McDONALD, OF SAN FRANCISCO, CALIFORNIA.

GEAR-SHIFT LOCK.

1,296,099.　　　Specification of Letters Patent.　　Patented Mar. 4, 1919.

Application filed February 13, 1918.　Serial No. 216,850.

*To all whom it may concern:*

Be it known that I, ARTHUR E. McDONALD, a citizen of the United States, and a resident of the city and county of San Francisco, State of California, have made a new and useful invention—to wit, Improvements in Gear-Shift Locks; and I do hereby declare the following to be a full, clear, concise, and exact description of the same.

The invention relates particularly to locks for the gear shift of motor vehicles.

One object of the invention is to provide for locking the gear shift lever in "neutral" to prevent its fraudulent operation. Other objects and advantages will appear as this description progresses.

In this specification and the annexed drawings, the invention is illustrated in the form considered to be the best but it is to be understood that the invention is not limited to such form because it may be embodied in other forms, and it is also to be understood that in and by the claims following the description it is desired to cover the invention in whatever form it may be embodied.

In the accompanying one sheet of drawings:—

Figure 1 is a perspective view of a gear shift lever of the rocker type having this invention applied thereto, shown in the open position and partially broken away to disclose the interrelation of parts.

Fig. 2 is an enlarged detail in plan of a portion of the inclosing casing and the locking lug assembled on the shift lever.

Fig. 3 is a detached detail of the locking latch assembly.

Fig. 4 is a plan view from above of a modification of the invention illustrating its application to the shift lever of a "selective type" of gear shift.

Fig. 5 is an elevation of the same partly in cross section on the line V—V, Fig. 4.

In detail the construction illustrated in the drawings includes the gear shift lever 1, having a ball and socket engagement at 2, with the socket 3 fixed on the pillar 4 of the gear case forming the fixed fulcrum for the lever. By this lever assembly the various gears in the gear case are selected and engaged for varying the gear ratio between the prime mover and the tractive element of the motor vehicle and with various modifications is conventional in this art.

The lock includes the casing 5, having a door 6 hinged thereto at 7 and locked in the closed position by the bolt 8 of the key-lock 9, the latch engaging a notch 10 in the contiguous edge of the casing 5. The casing and the hinged door are provided with the extended flanges 11—12 which combine to completely encircle the top of the socket 3 fixed to the pillar 4 by the screws 12', which the flanges 11—12 are flared outwardly to avoid. The casing 5 is provided with a recess 13 (Fig. 2) slidably encircling part of the lever 1, that is engaged on the opposite side by the recess plate 14, having a tongue 15 engaging the grooves 16 formed in the casing 5. The plate 14 combines with the top 17 of the door to close the top of the casing against tampering with the contents of the casing or the admission of dirt. Underlying the cover 14 and secured thereto is the yoke 18 combining with the recess 13 to slidably encircle the lever 1, the yoke ends 19 being screwed to the abutting surfaces 20 of the casing. The yoke 18 is provided with the interspaced lugs 21, between which the latch 22 is pivoted on the pin 23 and normally swung outward by the spring 24 interposed between the latch and the yoke 18 between the lugs, see Fig. 3.

The base member to which the casing is locked comprises the lug 25 fixed on the lever 1 by the screw 26, or in any other suitable manner, within the casing 5 which is guided thereon by guides 27 in the opposite ends thereof engaging the slots 16 of the casing.

The lug 25 is provided with the spring sockets 28—28 on opposite sides and counterbored to receive the springs 29—29 resting therein and bearing against the top plate 14, under tension, to lift the casing 5 upward until the flanges 11—12 disengage from the top of the socket 3, permitting the free oscillation of the lever 1 on its ball and socket connection. The rise of the casing 5 is limited by the rods 30—30 having their upper ends fixed in the plate 14 and the lower ends bent into eyelets 31—31, engaging beneath the recesses 28—28 to limit the rise of the casing.

The barrel lock 32 is fixed to the inner side of the door 6 with the key hole protruding through the top 17 to receive the key 33. This key actuates the wards in the lock to release the cam 34 permitting it to swing into and out of engagement with the latch 22 when the door 6 is closed.

This invention is operated substantially as follows:

In Fig. 1 the casing 5 is illustrated in the depressed position, with the flanges 11—12 engaging the socket 3. The casing is forced into this position against the tension of the spring 29—29 and held so depressed by the hand or the foot of the operator. This brings the head 35 of the latch 22 into alinement with the lower edge of the base 25 and in proximity to the cam 34 of the lock when the door 6 is closed. Holding the casing thus depressed, the key 33 is turned to the right which causes the cam 34 to force the latch 22 inward, against the tension of the spring 24 until the head 35 engages the lug 25, when the key 33 may be removed leaving the casing locked in the depressed position, holding the lever 1 against movement in any direction.

When it is desired to unlock the lever 1, the key 33 is inserted and turned to the left which releases the latch 22 which springs outward, under the tension of the spring 24, permitting the casing 5 to be raised by the springs 29—29 out of engagement with the socket 3, which releases the lever 1 permitting it to be moved at the will of the operator. The key lock 9 is made use of merely for permitting the inspection of the interior of the casing as desired, and may be dispensed with and other means substituted for protecting the locking mechanism within the casing against fraudulent manipulation.

A modification of the structure is illustrated in Figs. 4 and 5 for application to what is known as the selective type of gear shift, consisting of a series of parallel slots into and out of which the gear shift lever $1^x$ may be moved to select the desired gear ratio within the gear train. To hold the lever 1 in the neutral position, shown in Fig. 4, I provide the casing $5^x$ with the depending lugs or flanges 36 and 37 adapted to extend respectively into the slots 38 and 39 and engaging on opposite sides the division lugs 40 and 41. The interior locking mechanism within the casing $5^x$ is similar to that within the casing 5 and is controlled by the key $33^x$ in the same manner, so that the release of the locking latch permits the casing $5^x$ to rise, lifting the lugs 36 and 37 out of the slots 38 and 39 permitting the free manipulation of the lever $1^x$, as previously described.

Having thus described my invention, what I claim and desire to secure by Letters Patent is:

1. In combination with a fixed part and a movable part, a lock including a casing movable on said movable part and engaging said fixed part; a lug on said movable part; a latch pivoted in said casing and held normally out of engagement with said lug; and means for engaging said latch and lug and locking them in engagement.

2. In combination with a fixed part and a movable part, a lock including a casing movable on said movable part and engaging said fixed part; a lug on said movable part; a latch pivoted in said casing and held normally out of engagement with said lug; means for engaging said latch and lug and locking them in engagement; and springs interposed between said casing and said lug normally holding said casing in the inoperative position.

3. In combination with a fixed part and a movable part a lock including a casing movable on said movable part and engaging said fixed part; a lug on said movable part; a latch pivoted in said casing and held normally out of engagement with said lug; and means for engaging said latch and lug and locking them in engagement; springs interposed between said casing and said lug and normally holding said casing in the inoperative position; and means for limiting the action of said springs.

4. In combination with a pivotal gear shift lever and its fixed fulcrum part; a lock including a casing longitudinally slidable on said lever; a lug fixed on said lever; a latch pivoted in said casing and engaging said lug; means for locking said latch; and springs interposed between said casing and said lug.

In testimony whereof, I have hereunto set my hand at San Francisco, California, this 4th day of February, 1918.

ARTHUR E. McDONALD.

In presence of—
LINCOLN V. JOHNSON,
A. J. HENRY.